United States Patent [19]
Leininger

[11] Patent Number: 5,525,842
[45] Date of Patent: Jun. 11, 1996

[54] AIR TOOL WITH INTEGRATED GENERATOR AND LIGHT RING ASSEMBLY

[75] Inventor: Jon J. Leininger, Houston, Tex.

[73] Assignee: Volt-Aire Corporation, Houston, Tex.

[21] Appl. No.: 353,244

[22] Filed: Dec. 2, 1994

[51] Int. Cl.⁶ .................. F03B 13/00; H02P 9/04
[52] U.S. Cl. ........................ 290/54; 290/43
[58] Field of Search .............. 290/1 R, 43, 54; 310/47, 48, 50, 73; 604/67

[56] References Cited

U.S. PATENT DOCUMENTS

| | | | |
|---|---|---|---|
| 1,512,468 | 10/1924 | Johnson | 362/192 |
| 2,105,719 | 1/1938 | Collins | 310/75 A |
| 2,310,166 | 2/1943 | Way | 362/119 |
| 2,517,882 | 8/1950 | Johnson | 173/46 |
| 2,855,679 | 10/1958 | Gibble | 33/286 |
| 3,393,309 | 7/1968 | Leach et al. | 362/32 |
| 3,590,232 | 6/1971 | Sadowski | 362/32 |
| 4,102,198 | 7/1978 | Hammarlund | 340/505 |
| 4,302,797 | 11/1981 | Cooper | 362/119 |
| 4,354,183 | 10/1982 | Weeks et al. | 340/682 |
| 4,480,295 | 10/1984 | Shuster | 362/206 |
| 4,678,922 | 7/1987 | Leininger | 290/54 |
| 4,859,410 | 8/1989 | Brewer et al. | 419/10 |
| 4,911,882 | 3/1990 | Greenwald | 419/12 |
| 4,917,724 | 4/1990 | Sharma | 75/350 |
| 4,920,009 | 4/1990 | Lee et al. | 428/552 |
| 4,931,092 | 6/1990 | Cisar et al. | 75/244 |
| 4,985,072 | 1/1991 | Sahashi et al. | 75/246 |
| 4,988,336 | 1/1991 | Kohn | 604/67 |
| 4,992,234 | 2/1991 | Ohashi et al. | 419/23 |
| 5,003,434 | 3/1991 | Gonser et al. | 362/32 |
| 5,066,929 | 11/1991 | Frantz | 348/420 |
| 5,130,659 | 7/1992 | Sloan | 324/435 |
| 5,167,914 | 12/1992 | Fujimura et al. | 419/11 |
| 5,267,129 | 11/1993 | Anderson | 362/96 |

Primary Examiner—Steven L. Stephan
Assistant Examiner—Christopher Cuneo
Attorney, Agent, or Firm—Foley & Lardner

[57] ABSTRACT

An improved air tool includes an integrated air motor and electrical generator wherein the stator is positioned on a side of the rotor body opposite the working end of the tool to reduce vibrations transmitted to the stator. The stator is also positioned between the compressed air inlet and the rotor body such that compressed air flows across the stator to prevent overheating of the stator. The air tool includes an indicating circuit connected to the battery charging circuit for indicating a battery charge condition, a battery discharge condition, and a low lubrication condition of the air vanes. A light ring assembly is attached to the working end of the tool housing to provide light at the working end of the tool. Materials chosen for the magnets and the poles of the stator increase the power capability of the electrical generator. An illuminating apparatus for a conventional air tool includes a light ring with integral generator.

44 Claims, 16 Drawing Sheets

5,525,842

AIR TOOL WITH INTEGRATED GENERATOR AND LIGHT RING ASSEMBLY

BACKGROUND OF THE INVENTION

The present invention relates in general to improvements to air powered tools and, in particular, to improvements to air powered tools that have an air motor having an integral generator (integrated air motor generator or IAMG).

An air tool with an air motor having an integral generator is disclosed in U.S. Pat. No. 4,678,922 issued on Jul. 7, 1987 to the inventor of the present invention. U.S. Pat. No. 4,678,922 is hereby incorporated by reference. FIG. 12 shows the side-pole arrangement of the air motor and integral generator of the '922 patent. As shown in FIG. 12, the side-pole arrangement includes a bearing 139 at the working end of the tool, a bearing end plate 178, an insulating ring 142, coils 180, a magnet rotor 174 having magnets 176, an air chamber 134, a rotor shaft 146, a rotor body 148, fins 150, a bearing end plate 152, a bearing 154 and a retaining ring 156.

In the side-pole arrangement of FIG. 12, the magnet rotor 174 and coils 180 are positioned between the working end of the air tool and the rotor body 148. In such a position, it has been found that the magnet rotor 174 and coils 180 are subjected to a large a mount of vibrations transmitted from the working end of the tool. These vibrations are freely transmitted directly to the permanent magnets 176 in the magnet rotor 17 thereby causing detrimental changes in the magnetic properties (magnetic disorientation) over time. This magnetic disorientation results in diminished energy from the magnetic circuit and consequent diminished electrical output from the generator.

Another problem associated with the prior art side-pole arrangement is overheating of the coils 180. Overheating of the coils 180 causes the specific resistance of the current carrying conductors (wire) comprising the coils to increase thereby diminishing the electrical output of the generator.

FIG. 13 shows a prior art air tool 310 having rechargeable batteries 332, a handle 326, an air motor 318, a shaft 320, a casing 314, a disc 322, a lever 324, an air hose 312, an air hose fitting 316, a gooseneck 330 and a lamp 328.

A problem with the air tool of FIG. 13 is that the gooseneck lamp 330, 328 must be frequently adjusted to provide adequate lighting to the work surface. The gooseneck lamp 330, 328 also undesirably adds to the overall exterior dimensions of the air tool 310 thereby making it more difficult to work in cramped areas.

There has also been a need to provide smaller air tools which can generate the same amount of or more electricity than a larger tool. Smaller tools are desirable for working in smaller areas and for reducing the amount of materials required for manufacture of the tool. Increased power capability is desirable to provide better lighting and to enable other electrically driven devices to be powered by the integral air motor generator.

Another problem with the prior art air motors with integral generators is determining whether or not the generator is functioning properly. That is, if the generator malfunctions and power begins to be drawn from the batteries, it is desirable to know that the generator is malfunctioning prior to complete discharge of the batteries and consequent total loss of electric power.

Still another problem with the prior art is determining when the movable air vanes 150 (FIG. 12) are not adequately lubricated. Inadequate lubrication of the vanes 150 results in excessive wear to components of the motor, decreased power output and possible seizing of the motor. Therefore, it is desirable to have an indication of the lack of adequate lubrication prior to any damage to the tool.

A problem with air tools that do not have an integrated generator is that of providing adequate lighting to the work area. Battery packs or separate lighting devices are heavy in weight and increase the number of separate items that must be transported to a work area.

SUMMARY OF THE INVENTION

It is an object of the present invention to provide an improved air tool wherein the integrated generator is subjected to less vibration.

It is another object of the present invention to provide an improved air tool Wherein the integrated generator operates in a cooler environment.

It is yet another object of the present invention to provide an improved air tool with an integrated lighting device which is light in weight, automatically directed towards the working area and is small in size.

It is a further object of the invention to provide an improved air tool which can be made smaller in size.

It is still another object of the present invention to provide an improved air tool with increased electrical power capability.

It is yet another object of the present invention to provide an improved air tool which can indicate whether or not the generator is charging.

It is yet a further object of the present invention to provide an improved air tool which indicates whether or not lubrication to the air vanes is sufficient.

Another object of the present invention is to provide an illuminating apparatus with an integrated electric generator for providing light to a conventional air powered tool.

These and other objects of the present invention are achieved by an air tool having a working end and comprising a tool housing; a compressed air inlet; and an integrated air motor and electrical generator, for powering the air tool and positioned within the housing, the integrated air motor and electrical generator including a shaft mounted on a-bearing, for rotation within the housing; a rotor body attached to the shaft; a plurality of vanes connected to the rotor body; a plurality of magnetic elements disposed in the rotor body; and a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air.

Preferably, the bearing on which the shaft is mounted is positioned on a side of the rotor body adjacent the working end of the tool and the shaft does not extend beyond the opposite side of the rotor body.

Advantageously, the stator includes a stator housing and the air tool further comprises a rotor collar disposed on the shaft on a side of the rotor body adjacent the working end of the tool, for maintaining a desired gap between the side of the rotor body opposite the working end of the tool and the stator housing.

Another aspect of the invention includes an air tool having a working end and comprising a tool housing; a compressed air inlet; an integrated air motor and electrical generator, for powering the tool and positioned within the housing, the integrated air motor and electrical generator including a shaft mounted on a bearing, for rotation within-the housing; a rotor body attached to the shaft; a plurality of vanes connected to the rotor body; a plurality of magnetic elements disposed in the rotor body; an air cylinder made of a nonmagnetic material and surrounding the plurality of vanes; and a stator positioned within the housing axially aligned with the rotor body, wherein the stator interacts with the magnetic elements to generate electricity when the rotor body is rotated by the compressed air and wherein the air tool further comprises a battery charging circuit and a battery connected to the stator; and an indicating circuit connected to the battery charging circuit for indicating a battery charge condition, a battery discharge condition, and a low lubrication condition.

Preferably, the indicating circuit includes a resistance temperature detector bridge comprising a thermistor disposed in the vicinity of the air cylinder and responsive to a temperature of a cylinder wall and a thermistor responsive to a temperature of the compressed air.

In a preferred embodiment, the air tool includes a light ring assembly attached to the tool housing to provide light at the working end of the tool.

One embodiment of the light ring assembly includes a generally cylindrical retainer ring having open ends and connected to the tool housing; an annular lens disposed in the retainer ring at an end furthest from the tool housing; an annular reflector having a plurality of openings formed therein and disposed adjacent the lens; and an annular ring having a plurality of lamps that are inserted in the openings of the annular reflector wherein the lamps are electrically connected to the stator.

Another embodiment of the light ring assembly includes a lamp electrically connected to the stator; and a plurality of optical fibers having first ends optically coupled to the lamp and second ends that terminate in a circular array at the working end of the tool.

The present invention also includes an illuminating apparatus for a power tool having a spindle and a tool housing, the illuminating apparatus comprising a housing having first and second ends; a lens disposed at the first end of the housing; a lamp disposed behind the lens; a reflector surrounding the lamp and including a coil connected to the lamp; and a rotor including a magnetic element wherein the rotor is attachable to the spindle and is disposed adjacent the coil whereby rotation of the rotor induces electromotive force in the coil and wherein the second end of the housing includes a retaining ring for attachment to the tool housing.

These and other objects, features and advantages of the present invention will become apparent from the following detailed description taken in conjunction with the accompanying drawing.

BRIEF DESCRIPTION OF THE DRAWINGS

The drawings are hereby expressly made a part of the specification.

DETAILED DESCRIPTION OF THE PREFERRED EMBODIMENTS

An integral air motor generator (IAMG) converts compressed air into rotary torque and electricity. The inventive IAMG utilizes an improved sidepole stator and rotor arrangement.

Figure 1:
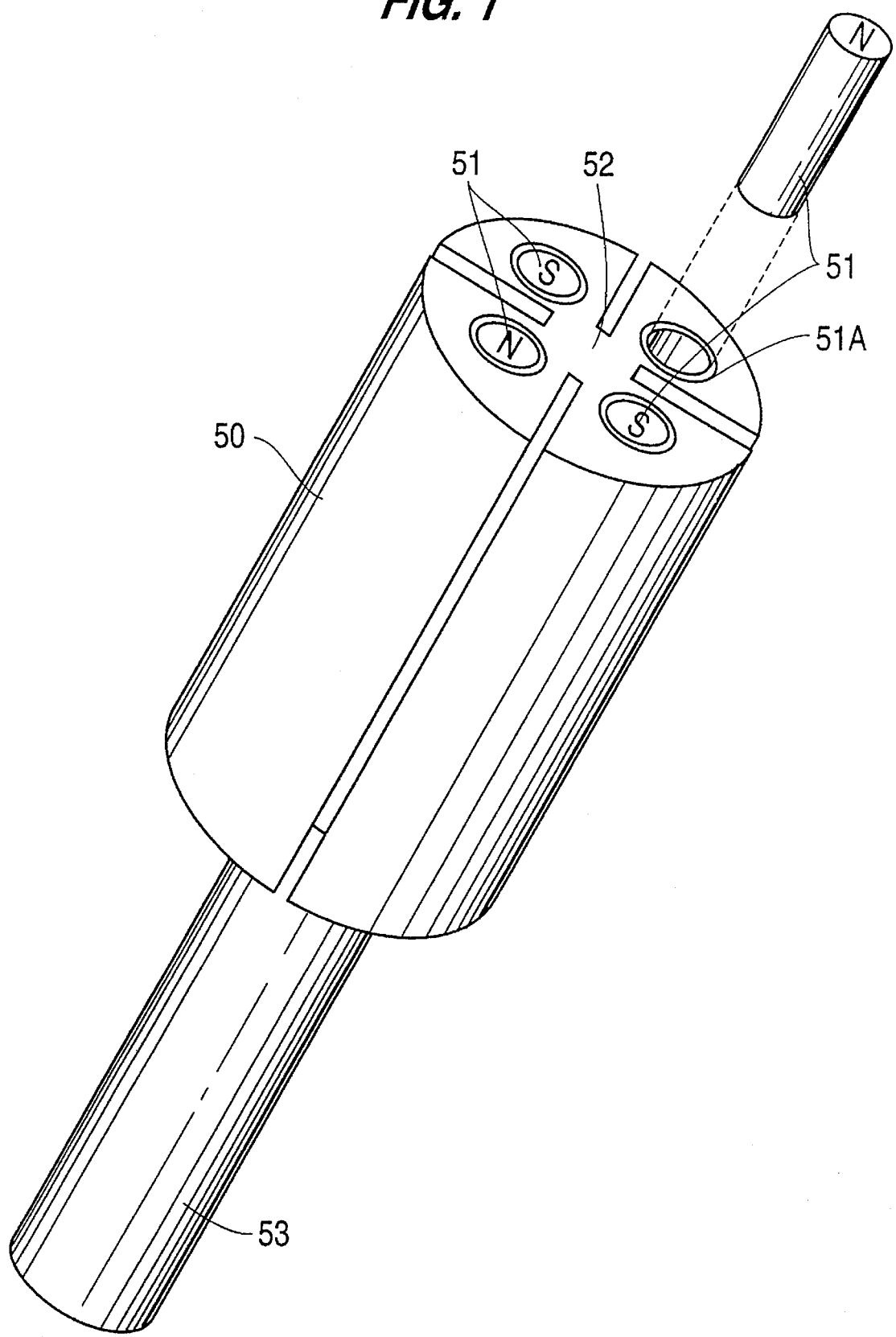
FIG. 1 is a perspective view of a cantilever rotor shaft showing the sidepole integration of magnetic circuit elements.

FIG. 1 shows a modified rotor body 50 referred to as a cantilever rotor. The cantilever rotor design improves magnetic induction and decreases the required amount of space, thereby allowing the incorporation of the IAMG into small air powered tools. Significantly improved magnetic induction in the electromagnetic circuit of the generator has been achieved through the incorporation of the magnetic elements 51 into the air motor rotor body 50 (or a segment of the same) in a sidepole arrangement as shown and utilizing nonmagnetic material for the shaft 53 and rotor body 50 (such as stainless steel carbon fiber reinforced thermoplastic or glass fiber reinforced thermoplastic).

An improved permanent magnet 51 is made of a metallic compound consisting of the element neodymium (Symbol Nd, Atomic number, 60, Atomic weight, 144.27) mixed with iron and boron (NdFeB), thereby replacing magnets of ceramic or cobalt. The utilization of the NdFeB material raises the average magnetic flux density in the electromagnetic circuit from about 27 mega gauss (MG), the maximum average in prior generator embodiments utilizing Samarium Cobalt, to about 38 MG with a maximum level of about 42.5 MG. The increased magnetic flux density proportionally increases the emf generated in the generator's stator coils.

Figure 12:
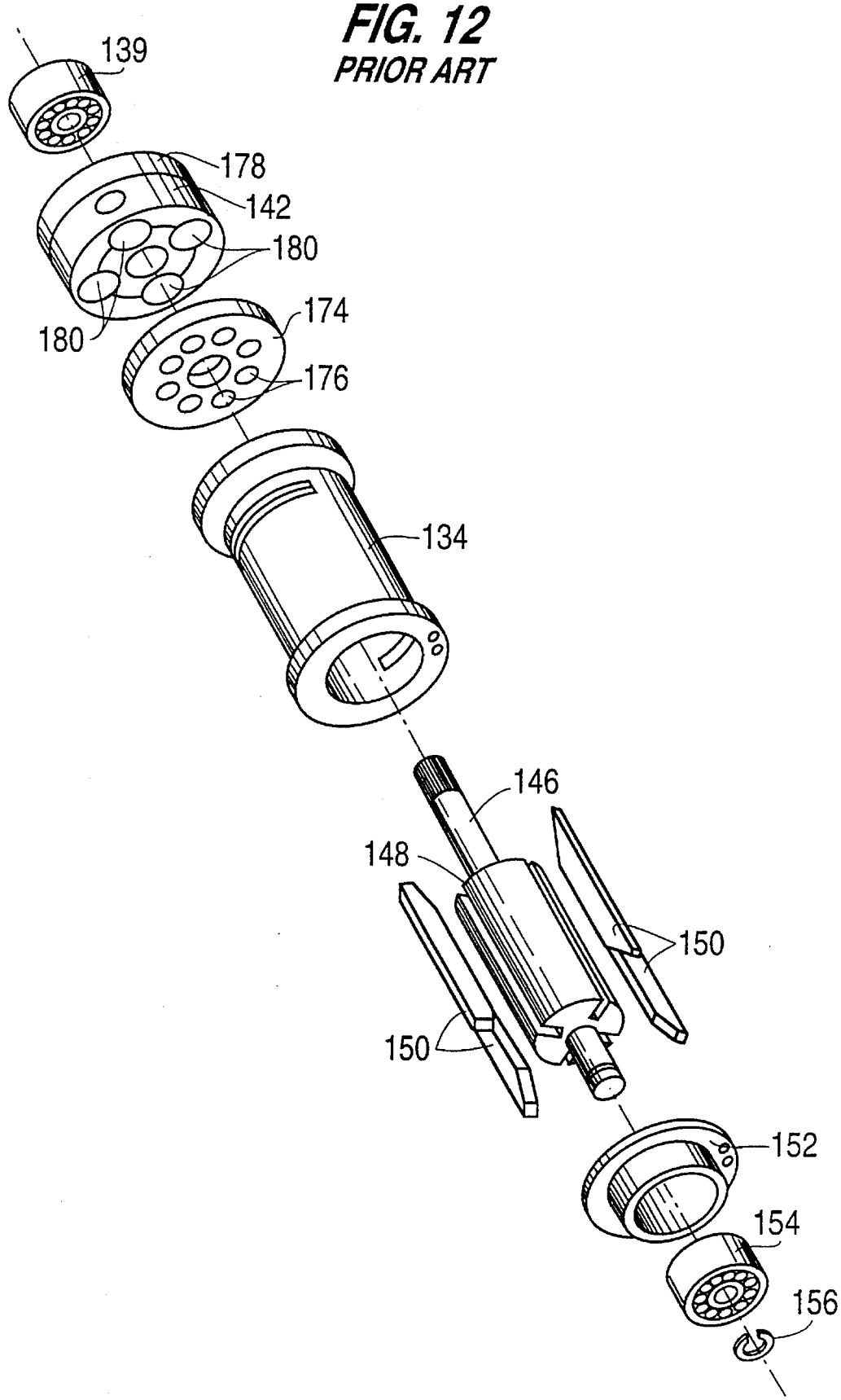
FIG. 12 shows a prior art side-pole air motor with integral generator.
Figure 13:
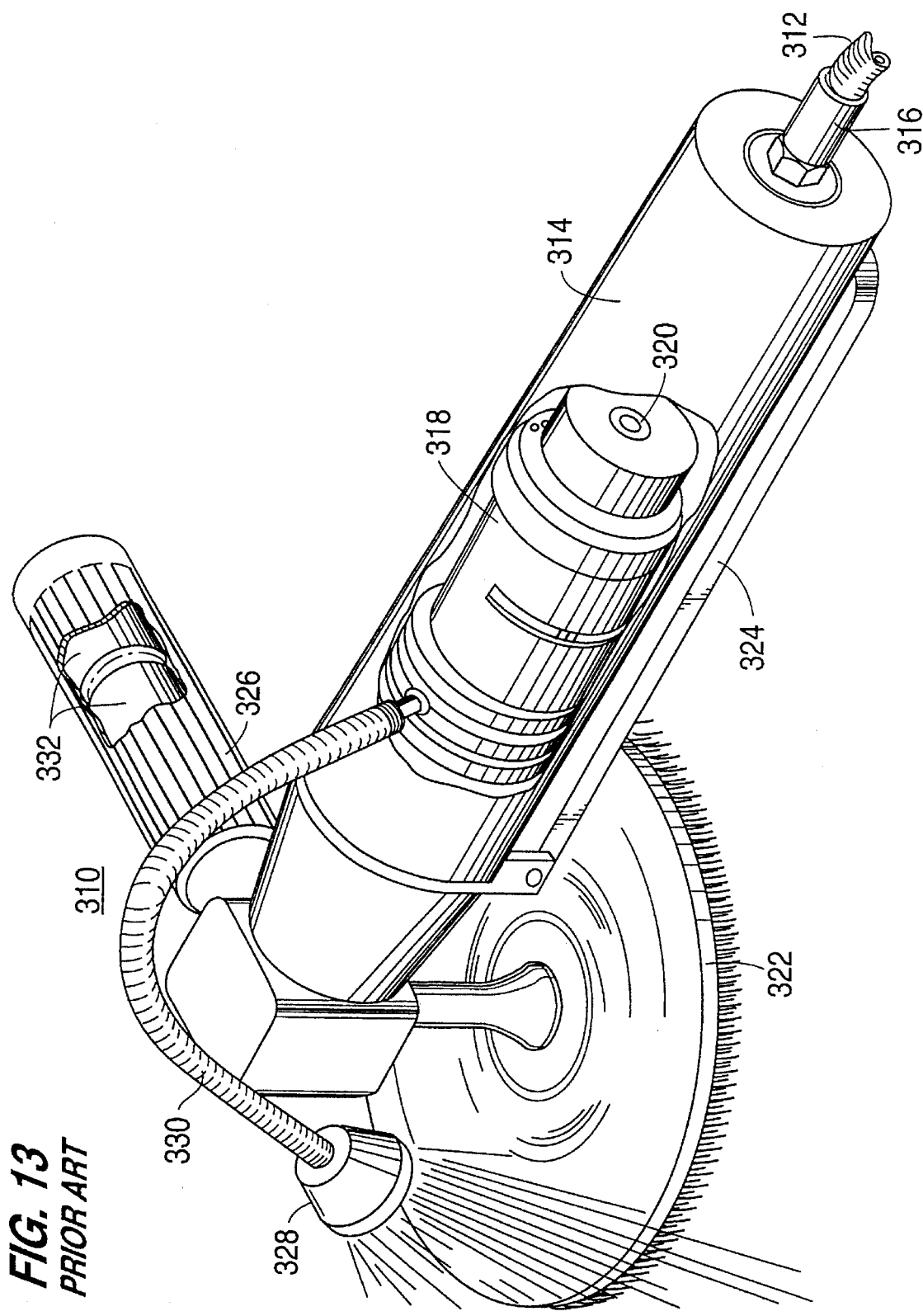
FIG. 13 shows a prior art gooseneck lamp on an air tool.

Again referring to FIG. 1, the amount of space required for the IAMG has been reduced by eliminating the axial rear support portion of the shaft that would be located at 52 and also eliminating the rear alignment bearing 154 and end plate 152 (see FIG. 12), thereby making room for the generator stator at the rear of the tool. A second alignment bearing is then positioned on the shaft's opposing (front) end at 53.

The cantilever rotor arrangement is not necessary when working with a conventional rotor shaft over one inch in diameter. In this case, the rear bearing can be set directly into the core of the generator's stator with a bore through the center of the core and stator housing to allow for the alignment of a conventional shaft. A bearing comprising magnetic material positioned as described has no detrimental effect on the conducting of magnetic flux through the core path.

Figure 2:
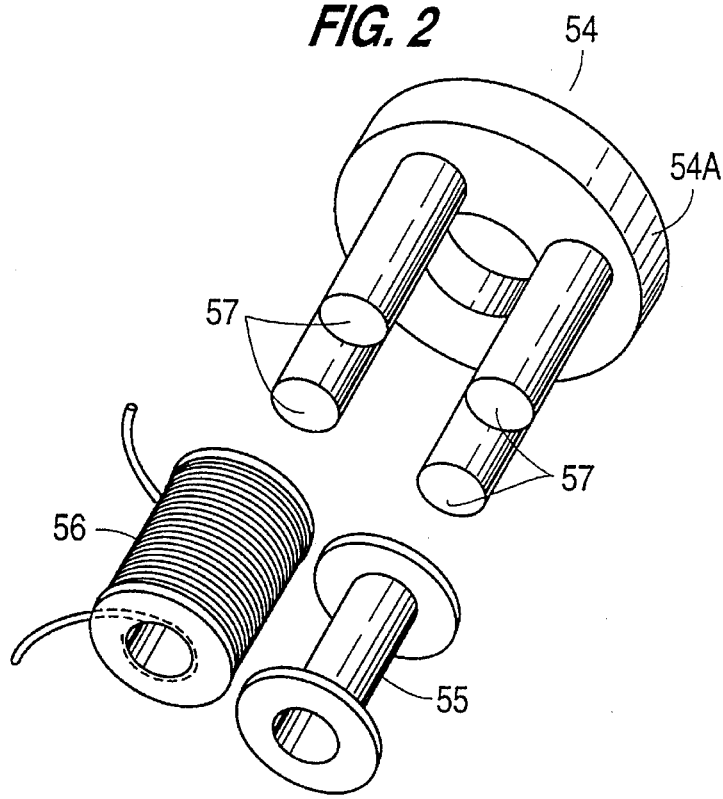
FIG. 2 is a perspective view of a four pole generator stator core showing the coil form and coils and their positioning with respect to the core.

FIG. 2 shows a side (four) pole stator core generally at 54, coil form 55 and coil 56. The stator core 54 has a ring or toroidial base configuration 54a with an even number of poles 57 which support plastic coil forms 55 with copper windings forming the coils 56. The poles 57 with coils 56 are positioned equidistant from each other such that the faces of each pole 57 line up with the faces of the magnets 51 in the rotor shaft 50 of FIG. 1. The object of the alignment is so that the magnetic flux is, for practical purposes, entirely within the core material as the magnets line up with the top of the poles, so that interaction with nearby components is minimized and also so that the flux follows a desired path through the center of the coils.

The core 54 may be made of a high-permeability magnetic alloy referred to as Hiperco 50A Permendur 49 containing 49.4 percent of cobalt (Symbol, Co, Atomic number, 27, Atomic Weight, 58.94), 1.94 percent vanadium (Symbol, V, Atomic number, 23, Atomic weight, 50.95) with the balance iron. Another alloy with similar magnetic properties has also been practiced, which alloy is referred to in the trade as Alloy 4750 containing 47.56 percent nickel (Symbol, Ni, Atomic number, 28, Atomic weight, 58.71) with the balance iron. These materials at their highest magnetic saturation exhibit a magnetic flux density near 1.2×10000 gauss or 1.2 teslas and have a low hysteresis loss. The above alloys were selected because they are capable of conducting magnetic flux direction (N/S) changes exceeding frequencies of 1000 Hz, which are necessary due to the rotational velocity of the rotor shaft's magnetic circuit assembly which may exceed 30,000 rpm.

Improved electrical induction has also been accomplished by utilizing coil windings 56 made of 100 percent copper (Symbol, Cu, Atomic number, 29, Atomic weight, 63.54) and having coil forms 55 with minimal inside wall thickness (approx. 0.010 inch).

Figure 4:
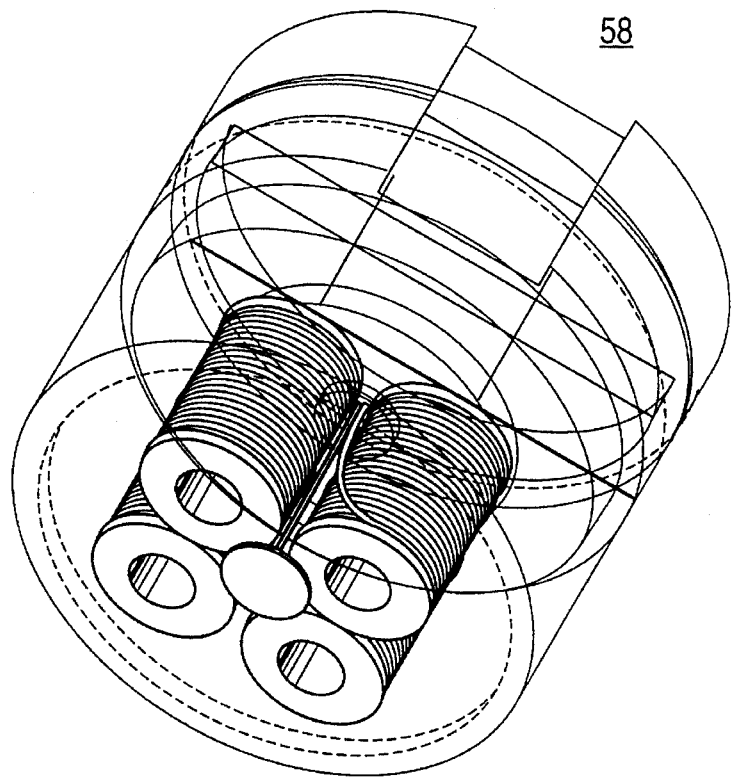
FIG. 4 is a composite multidimensional view of the stator in its assembled form.
Figure 3:
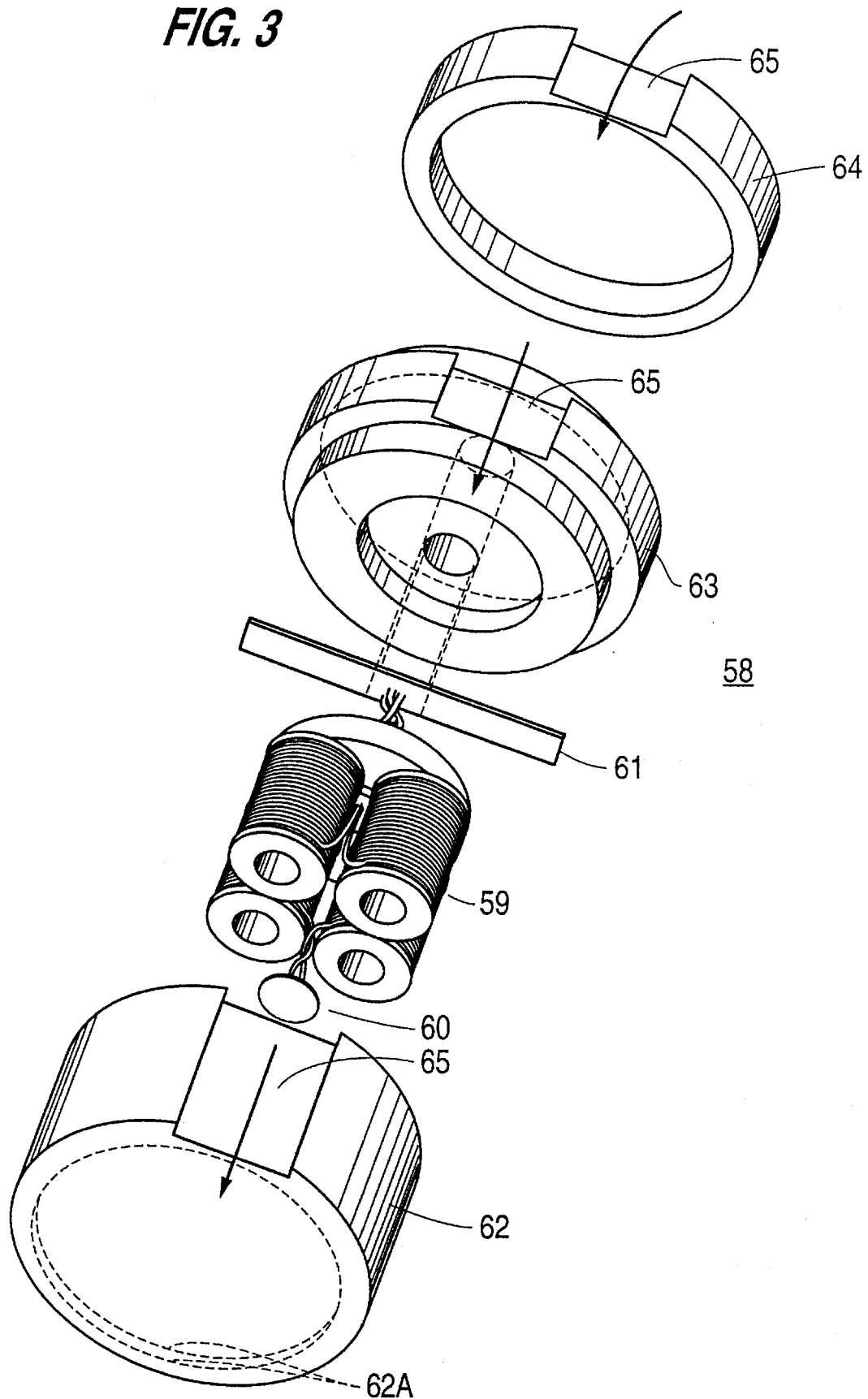
FIG. 3 is an exploded perspective view of an improved IAMG stator assembly showing the core with coils mounted, electrical connections and housing.
Figure 5:
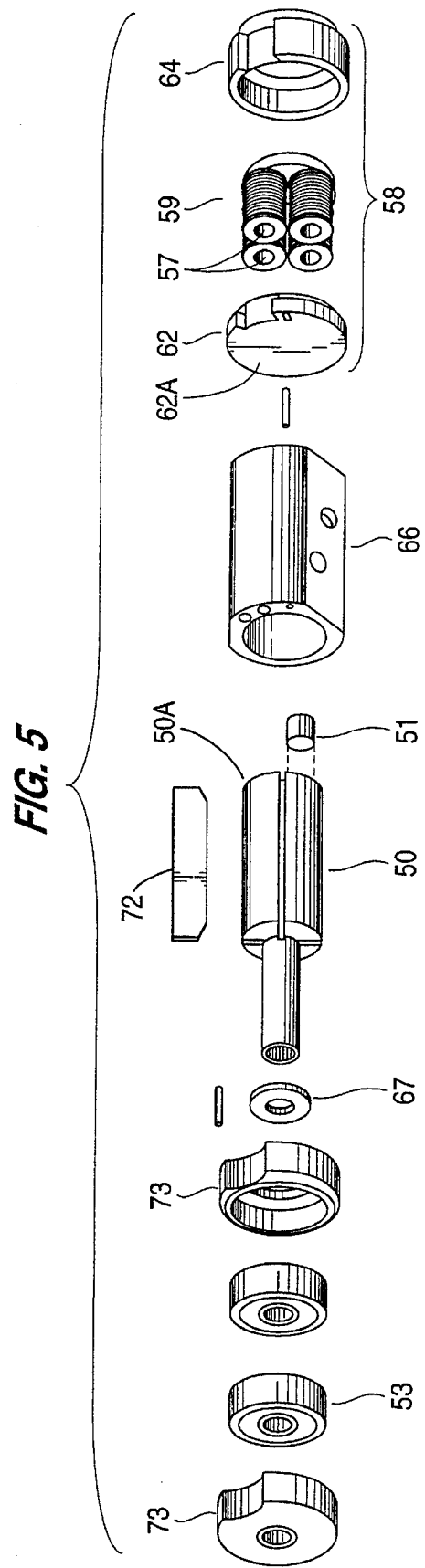
FIG. 5 is an exploded view of an IAMG showing the relative positioning of each of its components.

FIG. 3 shows an exploded perspective view of the components comprising the generator stator designated generally as 58. Included are the core and coil assembly 59, coil lead wires with positive circuit contact 60, coil lead wires with negative circuit contact 61, positive front stator housing 62, nonconductive spacer 63, and negative rear stator housing 64. FIG. 4 is a composite multidimensional view of the assembled stator and FIG. 5 is an exploded view of the IAMG showing the relative positions of the rotor 50, magnets 51 and stator 58 with the other components of the air motor.

Improved operating efficiency has been maintained for extended periods by positioning the generator stator 58 and corresponding rotor body magnetic elements 51 at the air inlet end of the air motor and, preferably, by further providing rubber or plastic damping sleeves 51A surrounding the magnets 51, thereby isolating the stator and rotor body permanent magnet components from transient vibrations transmitted from the working end of the shaft. That is, the generator stator 58 is positioned in axial alignment with the rotor body 50, on a side of the rotor body 50 opposite the working end of the air tool and the magnetic elements 51 are positioned accordingly. By positioning the stator 58 and damped rotor magnets 51 remote from the working end of the air tool, it has been found that the stator 58 and magnets 51 experience less vibration.

Less vibration is experienced because working end vibrations, such as grinding vibrations, diminish in amplitude due to the presence of resisting forces such as clamping of the bearings upon the working end of the shaft, compressed air resistance, and friction between the sliding vanes 72 and the rotor body grooves and between the sliding vanes 72 and the inside of the cylinder wall.

Improved abrasion resistance and consequent increased life of the air cylinder 66 may be achieved by chrome plating the inside of the air cylinder 66. The chrome plate provides a tougher surface against which the air vanes 72 bear.

Improved efficiency and durability is also accomplished by potting the core assembly 59 and circuit connections 60 and 61 in thermal conductive potting material (not shown) and enclosing the potted components within a nonferrous stainless steel or titanium housing 62 and 64. The potting procedure forms a monolithic structure permitting no movement of parts, having no external wire leads and no discrete external electrical connections other than the conductive halves of the generator housing separated by a nonconductive plastic spacer 63 (FIG. 3). The structural homogeneity provided by this method of construction maximizes the ruggedness of the device, protecting the otherwise sensitive core, copper windings and coil connections from the deleterious effects of the air motor environment.

Internal heat produced by current running through the coil wires is thermoconducted by the potting material from the windings to the metal housing 62 (heat sink). The internal heat is further dissipated through the air flowing through the air inlet channel 65 (FIG. 3) entering the IAMG cylinder 66. That is, the stator 58 is positioned between the compressed air inlet to the tool and the rotor body 50 such that compressed air flows across the stator 58 thereby conducting heat away from the stator 58. The air flow is guided by the air inlet channel 65 formed in the stator housing 62, nonconductive spacer 63 and rear stator housing 64.

Improved regulation of the magnetomotive drag coefficients and generator output has been achieved by adjustment of the air gap between the rotor magnets 51 and the stator poles 57 behind the stator housing face 62A. This critical tolerance is maintained through the use of a rotor collar 67 on the front (working end) of the rotor 50 to allow approximately 0.007 inch between the magnetic end 50a of the rotor and the stainless steel or titanium positive generator face 62A, and by providing a stator housing 62 with a wall thickness over the pole faces of approximately 0.010 to about 0.035 inch. Adequate structural strength of the stator housing 62 is ensured over the range of wall thicknesses by fabricating the stator housing 62 from, for example, titanium.

Figure 6:
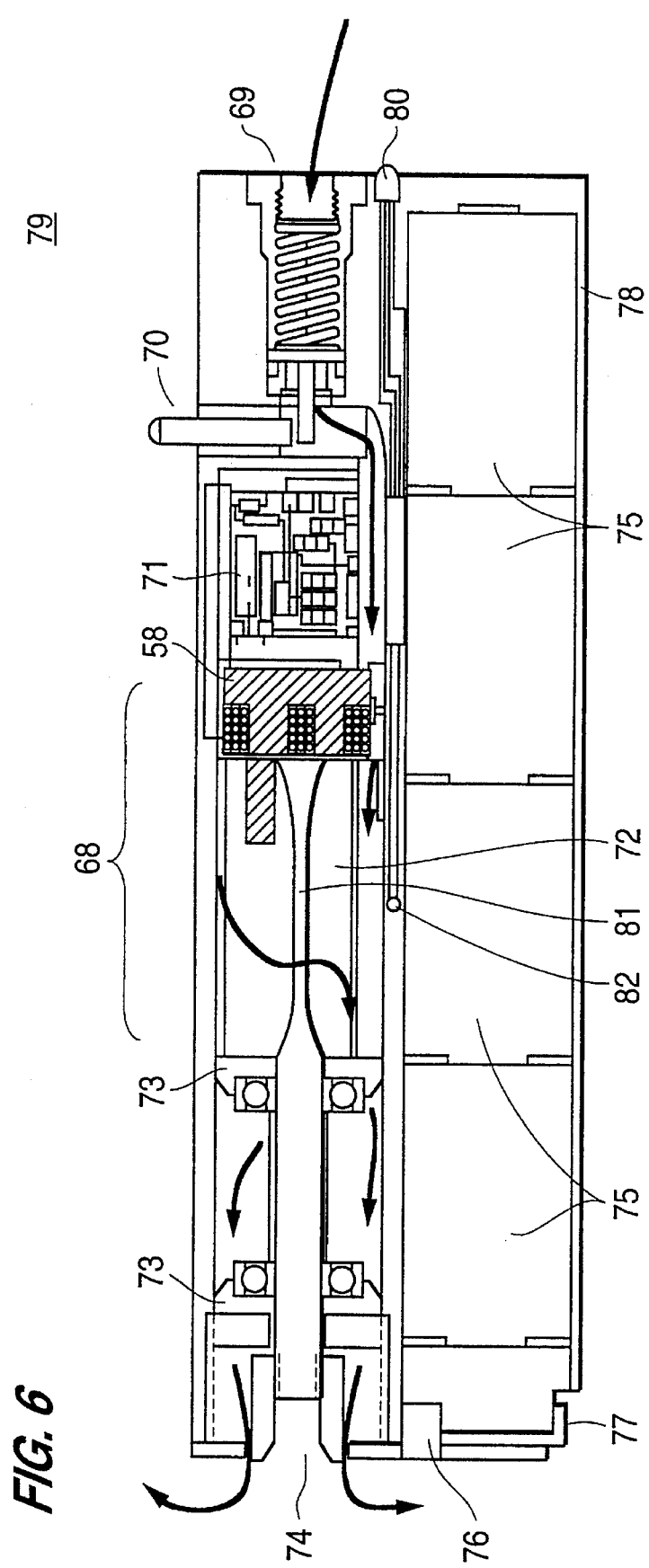
FIG. 6 is a transverse cutaway view of the interior of an air tool showing the air inlet, throttle mechanism, block diagram of battery charging and indicator LED circuit, generator stator, cantilever rotor with air vanes, front bearing supports, PTO (power take off), battery cells, electrical contacts and housing.

FIG. 6 is a transverse cutaway view of the interior 79 of an air tool showing air inlet 69 wherein the airflow is shown by arrowheads with broken tail lines, throttle mechanism 70, block diagram of battery charging and indicator LED circuit 71, generator stator 58, cantilever rotor 50 with air vanes 72, front bearing supports 73, power take-off (PTO) 74, battery cells 75, electrical contacts 76 and 77, and housing 78. The improved motor-generator 68 provides means for conversion of compressed air to electromechanical energy within the air tool. The air tool may employ batteries 75 and charging circuit 71 so that it may store excess electricity. The air tool is capable of being connected to a source of compressed air and utilizes a conventional air inlet 69 and throttle-mechanism 70 located at the supply end of the unit. At the opposing end a port 74 is provided allowing access to the working end of the IAMG rotor shaft 50. The rotor shaft 50 is engageable through a splined coupling located at 74 which provides means for a power take off (PTO).

In a preferred embodiment, the air tool employs an internal circuit having a full wave diode bridge integrated circuit for rectification of the alternating current to direct current, which rectifier is coupled to a battery charging circuit 71 with battery cells 75. The circuitry is connected with conducting wires (not shown) such that the batteries become charged while the IAMG is running. Further, in order to indicate the proper functioning of the generating device, proper lubrication to the sliding vanes 72 driving the IAMG and the momentary condition of the battery cells 75, a circuit utilizing an LED 80 as a tricolored light source is provided. The LED is conspicuously embodied within the housing of the air tool in visible range of the operator. The LED's three colors may indicate green for generator "charging," amber for "lubrication low" and red for "battery discharging," or any other suitable arrangement.

One method of constructing the LED circuit is to utilize a conventional battery charging circuit 71 with the integration of a resistance temperature detector (RTD) bridge circuit comprised of thermally sensitive resistors or thermistors. The bridge is electrically connected to the battery charging circuit to create a monitoring path using a fractional portion of the IAMG output as a drive current. One thermistor 81 in the bridge may be directly implanted in the IAMG air cylinder wall or embedded into the inner housing of the air tool adjacent the air cylinder and having surface to surface contact with the cylinder outer wall 82. Appropriate electrical contacts between the thermistor and the LED circuit are provided. An identical thermistor may be planted at a point where the temperature remains ambient with the compressed air entering the cylinder, such as adjacent the air inlet 69. Two other resistors having the same ohmic resistance are included in the circuit to form the complete bridge. This arrangement will provide a comparative sample signal which will become representative of the difference between a range of ambient temperatures and the cylinder wall temperature.

As the IAMG rotor and vanes begin to rotate, electrical energy forces current to flow to the load (appliance or battery) through the charging circuit 71 and LED 80 causing it to emit light. The circuit is designed so that the tricolor LED will emit green at a nominal level of IAMG current output. As the IAMG rotor vanes slide against the inside cylinder wall, heat due to friction from the sliding action is produced. As lubricating oil dissipates through operation of the air motor, more heat will be generated than the air flowing through the cylinder is able to carry away. Thermal conduction of the heat through the cylinder wall affects the first thermistor 81 by changing its conductive resistance. The resistance of the thermistor 81 will then differ from the resistance of the second thermistor associated with ambient air temperature, thereby causing an imbalance in the bridge and sending more (or less) current to the tricolor LED 80. The LED 80 is arranged to change color from green to amber with more (or less) current available for its consumption. The LED color change becomes a visible indication of the level of the air motor lubrication.

A resistor in the monitor circuit is set so that the LED will emit green at a temperature gradient known to be directly associated with normal temperature conditions and yellow when the frictional temperature reaches a point associated with a minimum acceptable level of lubrication. The tricolor LED may emit red when a load is drawing energy from the battery only and there is no generator current, such as when the air supply has been disconnected from the tool. This change in current is accomplished through transistor switching in the battery charging circuit. The LED 80 thus becomes an integrated indicator of the performance characteristics of the air tool.

The inventive thermistor-LED indicator circuit is applicable to known air motor lubrication systems. Typical methods for lubricating the air motor vanes include: (1) manual disconnection of the air tool from the air supply hose and the addition of droplets of oil to the tool air inlet with reconnection and running of the tool to force oil into the air motor; and (2) an in-line lubrication dispenser placed in the air line supply upstream of the air tool connection. In the first case, the LED indicator would indicate to the operator when to disconnect the tool and in the second case the indicator would indicate when it was necessary to add lubricant to the dispenser.

The interior 79 of the air tool shown in FIG. 6 may be housed in a nonconductive compression resistant plastic enclosure or housing 78. Optionally, electrical contacts 76 and 77 may be affixed about the PTO 74 end (working end) of the housing 78. The contacts 76, 77 are arranged in similar fashion to a conventional battery pack and are electrically connected to the internal IAMG 68 and batteries 75. The electrical contacts 76, 77 can be used as a source of power for additional components of an air tool.

The air tool may drive a plurality of conventional machine tool elements including but not limited to: a collet, mandrel, spindle, socket drive, drill chuck, screw driver bit, disc, pad or other device, the purpose of which is to perform a specific job. Various embodiments may also employ one or more electronic devices (appliances) or circuits, referred to above and described in greater detail herein, embodied with the tool to provide enhanced performance objectives.

Figure 7:
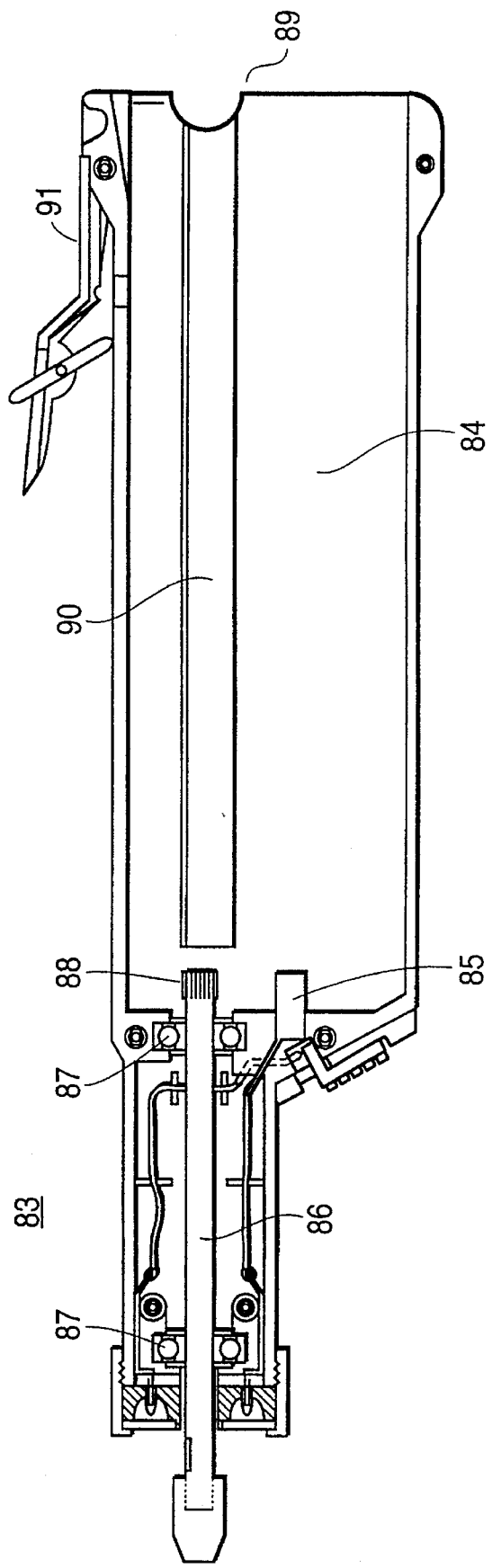
FIG. 7 is a transverse cutaway view of the exterior housing of an air tool having an integrated light ring appliance.

FIG. 7 shows a transverse cutaway view of the exterior housing 83 of the air tool. The interior 79 of the air tool shown in FIG. 6 is housed in a cavity 84 in the air tool housing 83. The cavity 84 may include internal electrical contacts 85 which mate with the contacts 76 shown in FIG. 6. A spindle shaft 86 extends beyond the housing 83 on the working end of the tool. The spindle shaft 86 is supported by bearings 87 and splined on its internal end 88 to match the PTO splined coupling 74.

The interior 79 of the air tool shown in FIG. 6 is inserted into the cavity 84 of the housing 83 shown in FIG. 7 from an opening 89 at the rear of the housing 83. The housing 83 is made of, for example, an impact resistant plastic such as glass reinforced Delrin. The interior 79 of the tool shown in FIG. 6 may be keyed longitudinally to fit into a channel 90 located on the inside of the housing 83. The key and channel 90 provides a means for precision alignment of the electrical contacts 76, 85 and the PTO 74 and shaft 86. Once inserted into the housing 83, the interior 79 may be locked into position by a mechanical locking means (not shown) located at the air inlet end of the tool so that when throttle lever 91 is actuated the IAMG 68, of the air tool begins to rotate as a result of compressed air entering through the air inlet 69.

Figure 8:
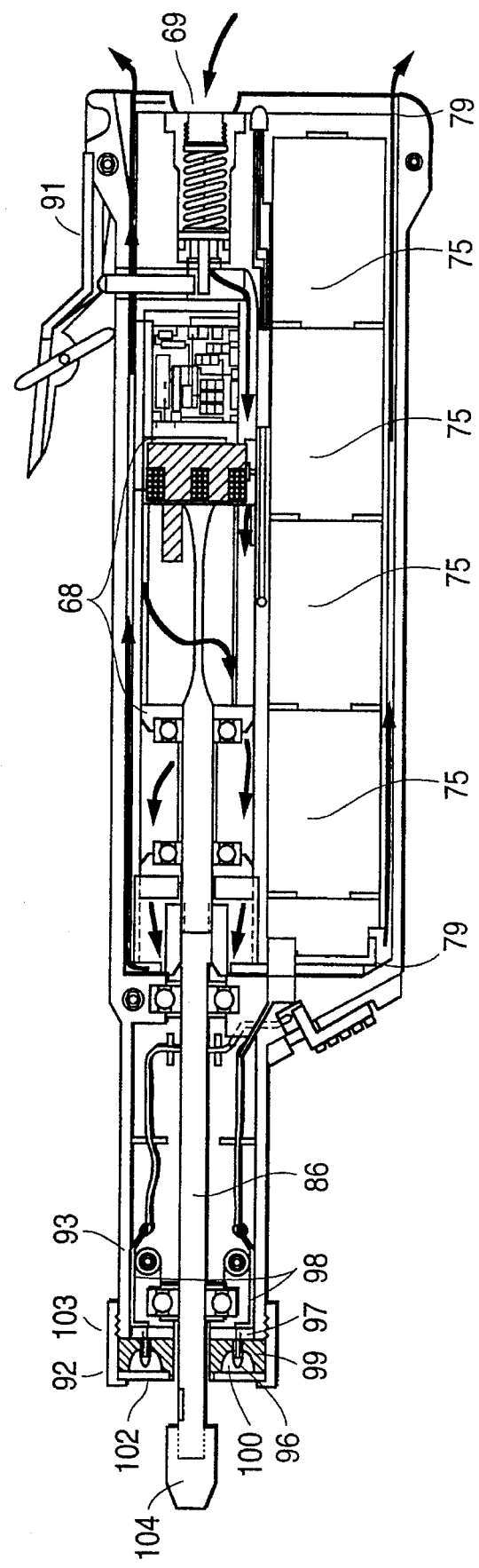
FIG. 8 is a transverse sectional view of a complete air tool having an integrated light ring appliance.

FIG. 8 shows the interior 79 of FIG. 6 inserted into the housing 83 to form a complete air tool.

Figure 9:
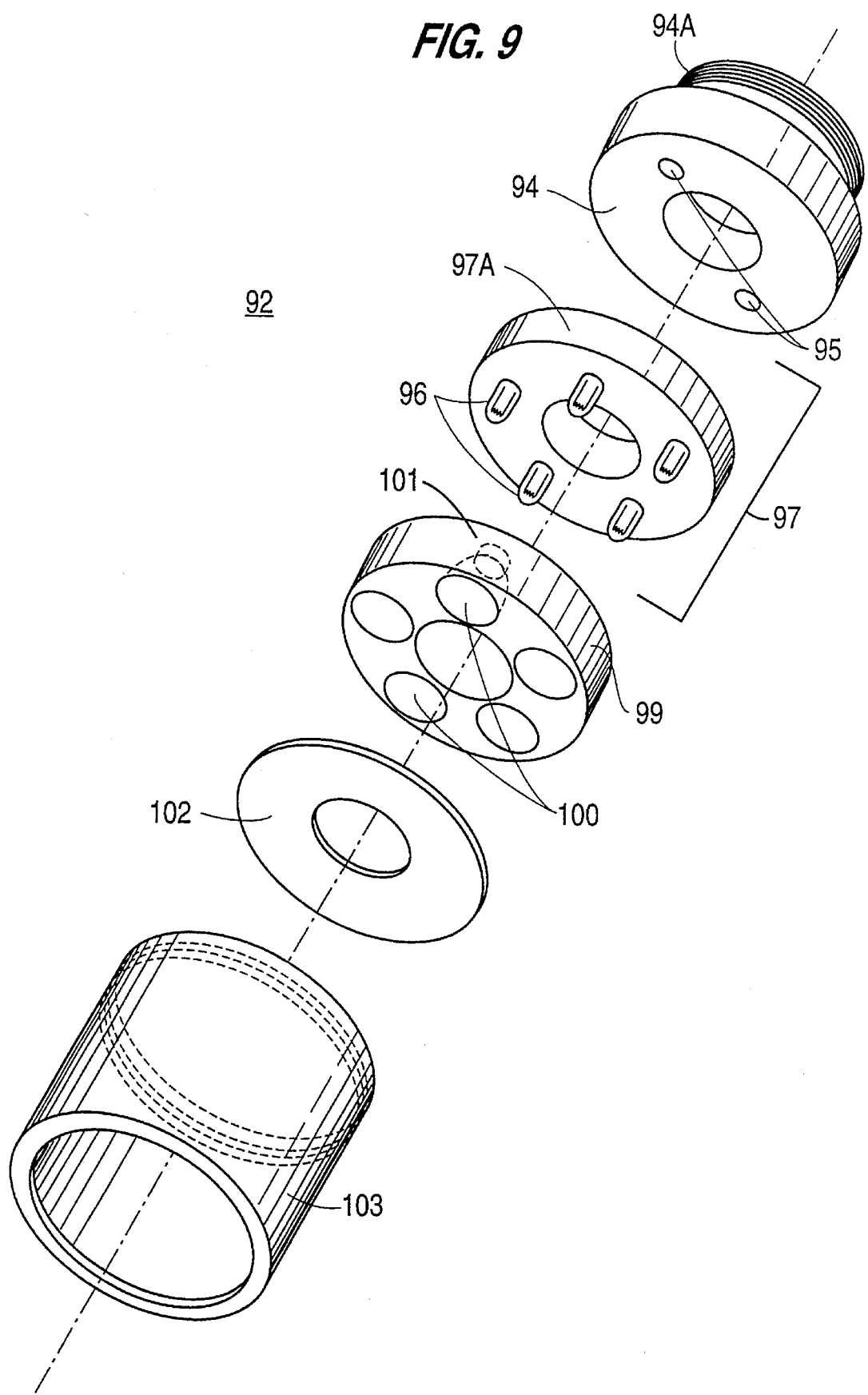
FIG. 9 is an exploded perspective view of a light ring appliance.
Figure 10:
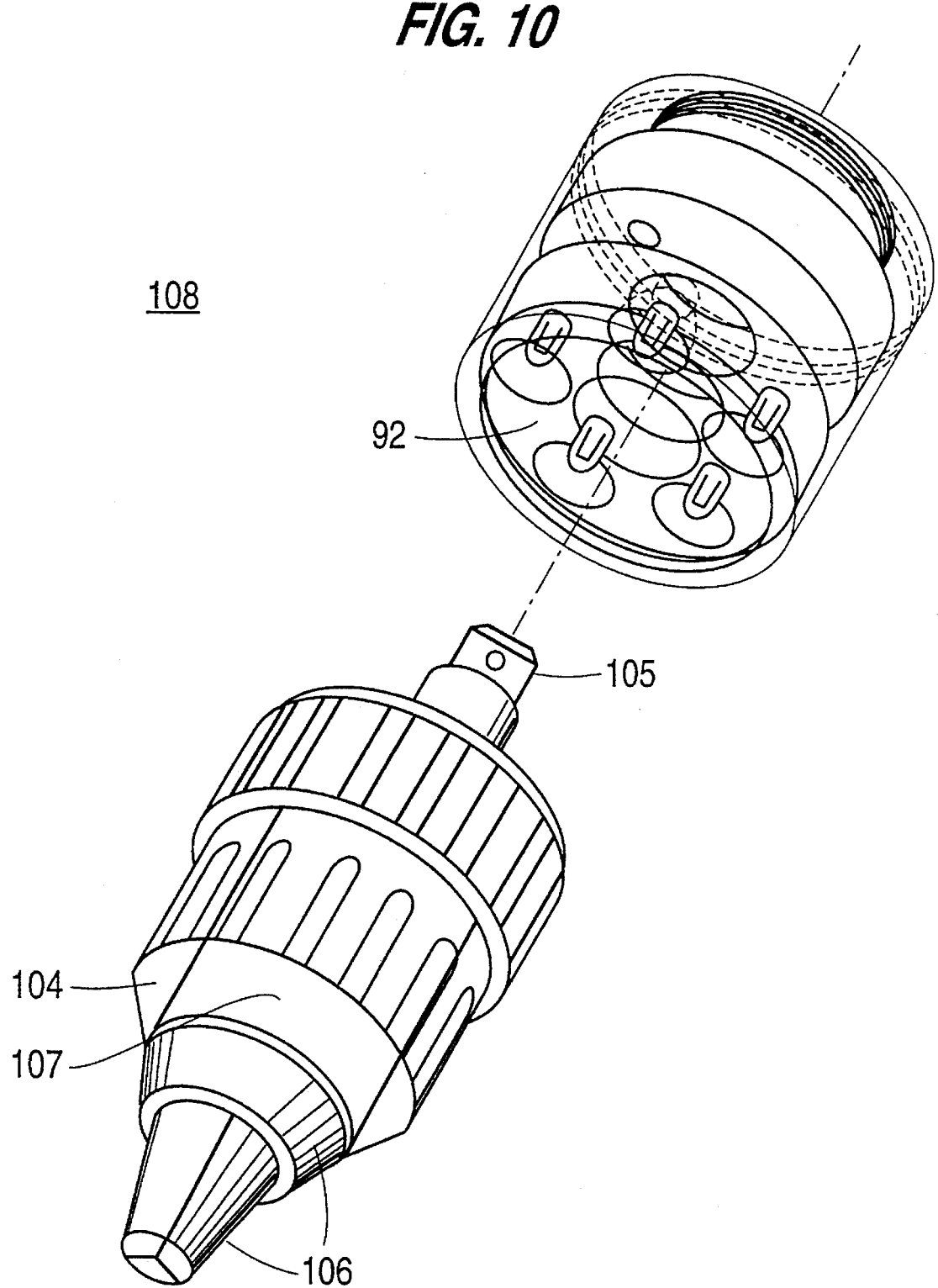
FIG. 10 is a multidimensional view of a tool light ring assembled in relation to a keyless drill chuck of clear plastic which can allow light to pass through to the drilling surface.

FIGS. 8–10 show a tool light ring appliance 92 attached to the housing of the tool at the working end of the tool. The light ring appliance 92 does not obstruct the view of the work by the operator of the tool from virtually any angle and provides a good source of illumination to the central focal point of the work and in an area radiating out 360 degrees therefrom.

In one embodiment, the air tool drives a tool such as a drill, grinder, polisher, screwdriver, nutrunner, ratchet or impact tool having the improved and unique light ring appliance. The light ring appliance may be formed integrally with the tool body which houses the tool's working end components or may be threaded thereon. The appliance 92 is physically unobstructive to the view of the work by the operator of the tool from virtually any angle. Because the need for improved lighting exists with other types of tools as well, the development of the light ring appliance is also intended by the inventor for applications beyond the scope of air powered tools.

It is commonly known that wherever air tools and other non-electric tools are used, it is difficult to maintain adequate lighting on the workpiece, particularly when working in closed areas. A discrete lighting fixture such as a trouble light or flashlight can get in the way of the work, and requires a separate means of attachment or support to properly illuminate the work. Furthermore, a discrete lighting fixture added to the tool body, such as a flexible gooseneck extension, may detract from the profile and esthetics of the tool and further reduce the mobility of the tool, in comparison to a tool having no such fixture. It has also been found that a lighting fixture appending from the tool body and having only one lamp lights the work area from a single angle thereby leaving a distracting shadow on the work area and sometimes fringe patterns in the lighted area. These undesirable factors suppress interest in having embodied lighting fixtures associated with tools. The present invention therefore relates to improvements over existing limited lighting means and to solutions to the problems raised thereby.

Referring now to FIGS. 8 and 9, the invention includes a power source such as the IAMG 68 (a battery in a conventional cordless tool or household current in an electrically driven tool). In each embodiment a light ring appliance 92 is electrically connected to the power source. In one embodiment the light ring 92 is physically united with the tool casing 93 in proximity to the working end of the tool and facing the work so as to properly facilitate placement of the light provided by the light ring upon the work area. Removability is provided by a threaded attachment so that proper servicing of the tool, such as bearing and lamp replacement, can be accomplished.

The light ring 92 may comprise five basic components. A first component is the base 94 which is a rigid structure made of, for example, a nonconductive plastic and having a cylindrical ring configuration. The outside diameter of the base 94 is smaller than that of the tool housing end and is threaded at 94A so that it may be screwed into place within a threaded cavity at the working end of the tool. The base 94 provides fixturing and electrical conducting means for uniting the other light ring components to the tool housing and provides electrical contacts 95 to provide power for the lamps 96. Alternatively, the base 94 may not be used and the electrical connections may be made directly to the ring 97A.

The second component is an array of miniature incandescent lamps 96 referred to generally as a multi-pak 97. Each lamp 96 in the array is electrically connected to each other in parallel (circuit not shown) so that if one lamp burns out the others will continue to illuminate. Each lamp 96 is evenly spaced apart from the other in an encircling arrangement as shown and held together in a uniform matrix by a molded ring shaped structure 97A made of, for example, nonconductive plastic and which encapsulates the bottom portion of each lamp's glass envelope and the (connected) electrical leads from each bulb. Furthermore, the multi-pak's plastic encapsulant incorporates electrical contacts (not shown) having a negative and positive surface through which current is supplied to the lamp array circuitry from the base contacts 95. The contacts 95 may be positioned diametrically on the ring's outer circumference (recessed from the surface) or on the component's back side where surface-to-surface contact with the threaded base 94 is made (depending on which mode of conductance from the power source is utilized and depending upon the field polarity of the tool housing, if conductive). Preferably, multi-pak array 97 has the same outer diameter and bore as the base 94 upon which it is positioned. The electrical contacts 95 mate on their opposing ends (not shown) with current carrying conductors 98 embodied with the tool housing upon uniting the assemblage to the housing.

The third component is the reflector 99 which is a single solid structure made of, for example, highly polished aluminum or vacuum metalized plastic and having on its face one recessed parabolic opening 100 for each lamp 96 in the multi-pak 97. The reflector 99 preferably has the same outer diameter and bore as the threaded base 94 and the multi-pak 97 and includes apertures 101 through which the lamps 96 protrude from its backside into each of the parabolic openings 100. The apertures 101 in the reflector 99 are spaced according to the spacing and number of lamps 96 in the multi-pak 97 so that the reflector 99 fits over the lamps 96 and contacts the surface of the multi-pak's encapsulant structure.

A fourth component is a ring-shaped clear lens 102 which fits over the reflector face and is held into position with the reflector and the multi-pak by the fifth component, a threaded retainer ring 103. The retainer ring 103 screws onto the threaded outer tool housing (in similar fashion to a conventional flashlight assembly).

The working spindle of the tool 86 runs through the center bore of the base 94, multi-pak 97, reflector 99 and lens 102. The spindle 86 may be threaded to accept a standard locking collet 104 in which various tool bits may be inserted.

The encircling arrangement of the individual incandescent lamps 96 provides radiant light in a direct line from each of the lamp's filaments, and light is also reflected from the multiple parabolic reflectors 100. Therefore, the tool bit and surface directly in front of the tool are brightly illuminated without shadows or obstructions and with minimal fringe patterns.

The light ring appliance places light upon the work at a central focal point from the tool bit, radiating outward in 360 degree circular proximity, emanating from the tool body.

FIG. 10 shows another embodiment of the light ring 92 which uses clear acrylic or polycarbonate plastic medium to form a structural light conducting component. In this embodiment, a keyless clear plastic light conducting drill chuck accessory 108 includes a common and ordinary steel jaw locking mechanism 106 and a wrench style square drive 105 positioned in front of a light ring 92. The drill chuck accessory 108 takes the position of the lens 102 shown in FIG. 9 to direct light to the drilling surface. The face angle of the clear plastic chuck 104 may be modified somewhat over one which is conventional so that light may be focused where the drill contacts the drilling surface. Furthermore, the exterior surface of the plastic cylinder forming the clear plastic chuck 104, and the metal cylinder 107 in the center of the chuck, may be metalized with aluminum or chromium thereby causing mirrored light to also be reflected from the end of the chuck. The light ring assembly 92 may be affixed to the air tool housing as an accessory or unitized with the housing of the tool during manufacture. In use, light from the light ring source passes through the clear plastic portion of the drill chuck structure and onto the workpiece.

Figure 11:
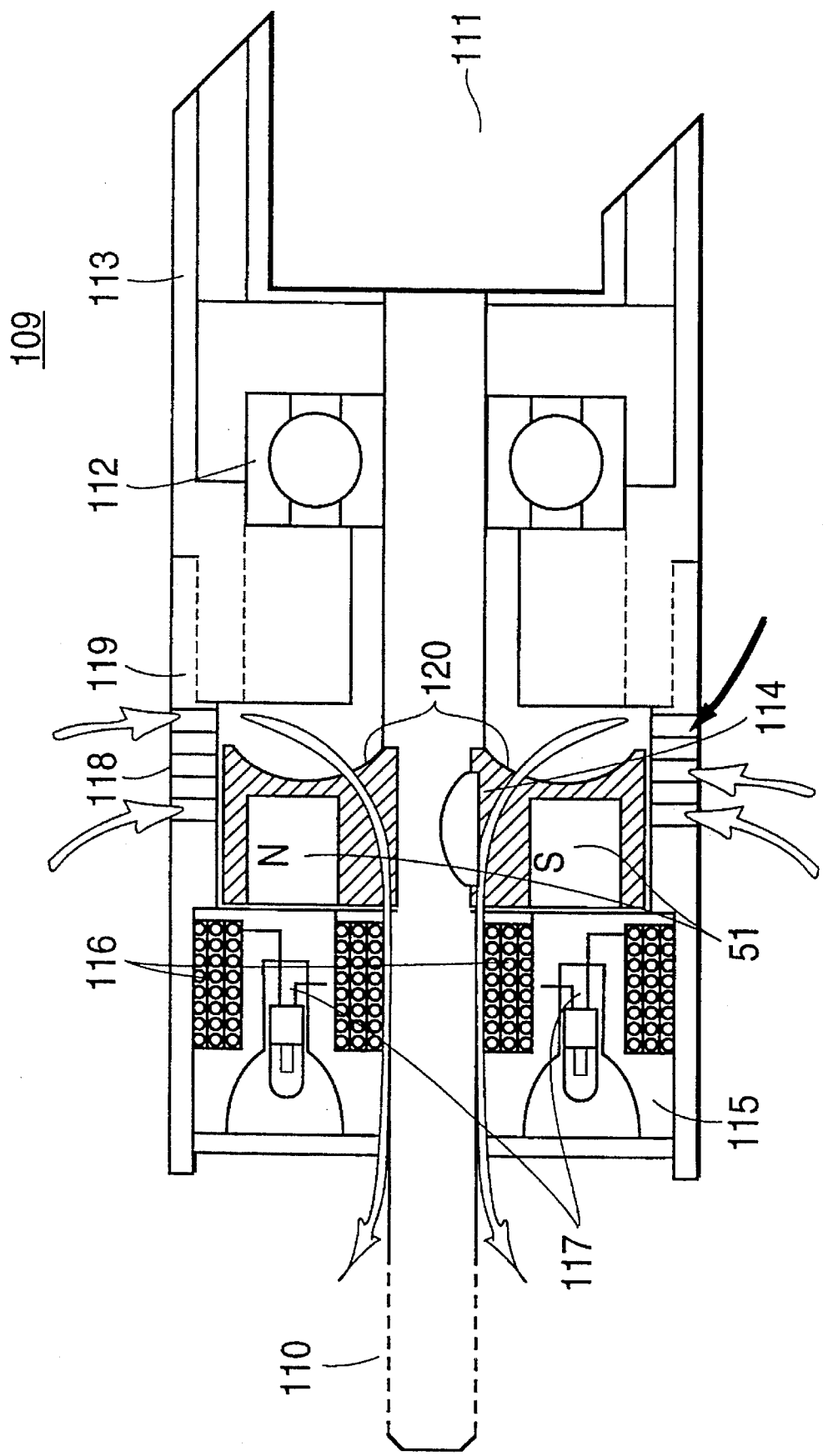
FIG. 11 is a partial transverse cutaway view of the front portion of a high speed tool showing an integrated light ring generator attached to the tool.

FIG. 11 shows another embodiment which involves the integration of a light ring with a magnetic rotor and stator, components similar to those previously described that comprise the generator of an IAMG, to form a unique tool illuminating accessory driven by a conventional airmotor of an airtool. The partial transverse cutaway view in FIG. 11 shows an integral light ring generator generally at 109 with a spindle 110 driven by a tool rotor at 111. The spindle 110 is supported by a bearing 112 and enclosed by a tool housing 113. A rotor structure segment 114 contains the magnetic circuit elements 51 as shown in FIG. 1, and may be formed integrally with air moving fan blades 120 for cooling. The airflow through the illuminating accessory is shown by arrows with broken tail lines. The rotor structure segment 114 is affixed by set screw or key way to the spindle 110 so that the magnet rotor structure 114 spins with the spindle. A light ring reflector 115 is constructed of the alloy material utilized in the construction of the core of the IAMG stator, previously described. In addition to providing means for the reflection of light, the reflecting component 115 conducts the magnetic flux alternations from the spinning magnets 51 through the coils at 116 thereby causing emf to flow in the coil circuit and through the lamp matrix 117 thereby causing light. Cooling ports 118 may be provided in the retaining ring 119 so that air can be drawn in for cooling the coils 116 and light reflector 115. As an accessory for an air tool, such as a high speed die grinder, the integral light ring generator can easily be threaded into position onto a conventional air tool.

Another embodiment of the integrated light ring which accomplishes the same objective involves the use of light conducting fiber optic elements arranged in an encircling array about the working end of the tool. This embodiment may utilize a single incandescent lamp which is optically coupled to converging ends of the fiber optic filaments from a point about the exterior housing or from within the enclosing body of the tool. The fiber optic light conductors may further be encapsulated in a durable opaque plastic vinyl in a molding process to form a flexible tool body boot. The molded vinyl boot would also serve as an aesthetic shock resistant cover to protect both fiber optics and tool housing.

FIGS. 14A, 14B, 15A, 15B, 15C, and 16 show an embodiment of a pneumatic tool luminaire whereby S illumination to the work surface is accomplished by having a light source internally positioned inside the housing of the tool and whereby light is transmitted from the light source through light guides. The light source may be high intensity such as conventional quartz-halogen with tungsten filament, state of the art metal halide (no filament), radio induction (no filament), or solid state diode laser (for use in conjunction with optical line generation technology); each with respective driver circuitry constructed in axial alignment unity with the generator. An advantage of this embodiment is that it maximizes isolation of high energy (high heat or radiological) light sources from the work environment. This isolation reduces, if not entirely eliminates, the chance exposure to harmful ultraviolet, infrared or radio emissions and the ignition hazard from an exposed arc of a broken lamp envelope. This embodiment also provides an efficient method for cooling the lamp, generator and power supply apparatuses using compressed air entering the tool. Furthermore, this embodiment eliminates wires and electrical connections outside the generator-luminaire unit, thereby facilitating the use of the luminaire with conventional cast aluminum (conductive) housings. Light conductors, referred to as optical fibers and composed of glass or clear plastic, are used to conduct light from the internal light source to the exterior working end of the tool where converging ends of the optical fibers transmit light to the work surface from a circular "light ring" array.

Figure 14A:
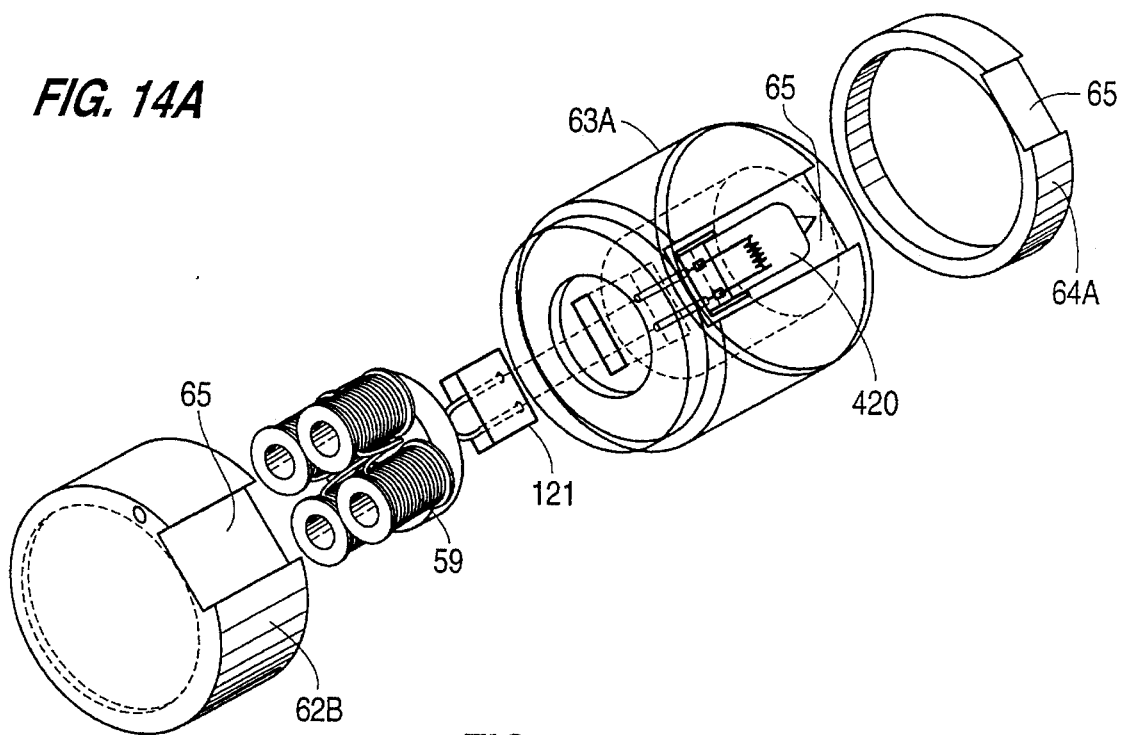
FIG. 14A is an exploded view of another embodiment of a stator assembly.
Figure 14B:
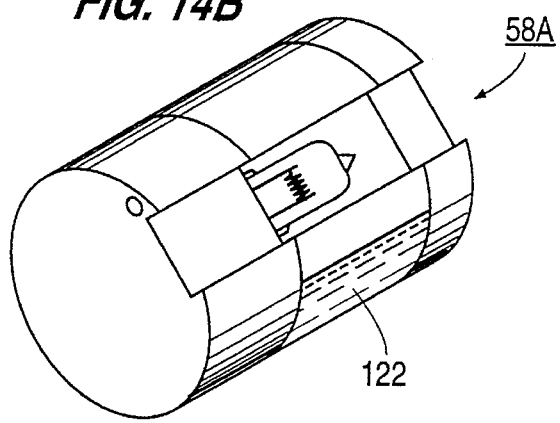
FIG. 14B shows the stator assembly of FIG. 14A assembled.

FIG. 14A shows an exploded perspective view of a generator stator core and coils 59 connected to a single light source 420 enclosed by a front housing 62B, a transparent mid-section 63A and a removable end plate 64A. FIG. 14B shows the components of FIG. 14A assembled in a complete unit designated as 58A.

Unlike the generator described in FIG. 3, which conducts electricity to positive and negative contacts at either of its exterior end plates, the stator coils 59 in FIG. 14A have a direct electrical connection to a single high intensity lamp 420 through a ceramic connector 121 containing appropriate electrical contacts, each positioned axially at the rear of the generator stator 59. A glass envelope surrounding the bulb 420 is further housed in a transparent cylindrical section 63A made of, for example, glass or polycarbon plastic. The section 63A replaces the nonconductive ring 63 shown in FIG. 3. The transparent section 63A may be partially silvered internally with reflective material to create a reflector 122 to concentrate light toward opposing points on the section (these points will line up with "windows" in the tool body). The rear housing 64A is removably connected to facilitate lamp replacement. An air inlet channel 65 directs compressed air to the airmotor via the length of the generator lamp assembly thereby effectively cooling the assembly during generator operation and lamp ignition. High intensity lamps such as halogen or metal halide arc depend on high temperatures for efficient cycling of reactive elements while producing intense light output. The particular choices of material used, the dimension of the cylinder wall of the transparent section 63A and the surface area of the reflector 122 may vary as a means for regulating heat dissipation for optimal operating temperature.

Figure 15A:
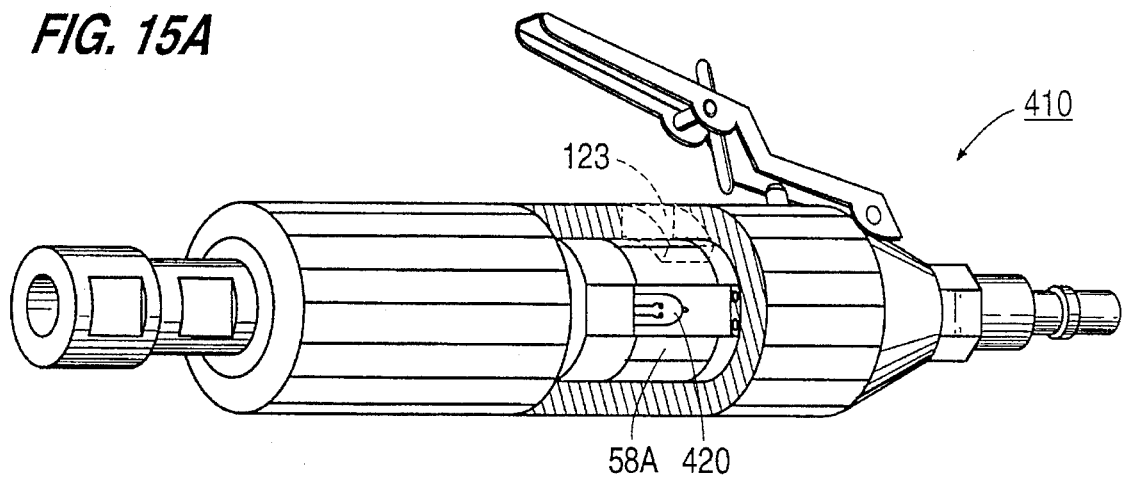
FIG. 15A shows the stator of FIG. 14B in an air tool with the housing partially cutaway.

Referring now to FIG. 15A, the integral generator luminaire 58A is shown in position inside an air tool, in this case a die grinder, designated as 410. The tool housing includes a number of "windows" or openings 123 which are each aligned with transparent nonreflective portions of section 63A of the generator luminaire 58A, once in position within the tool. This arrangement allows light from the source 420 to pass through the tool body at a plurality of points.

Figure 15B:
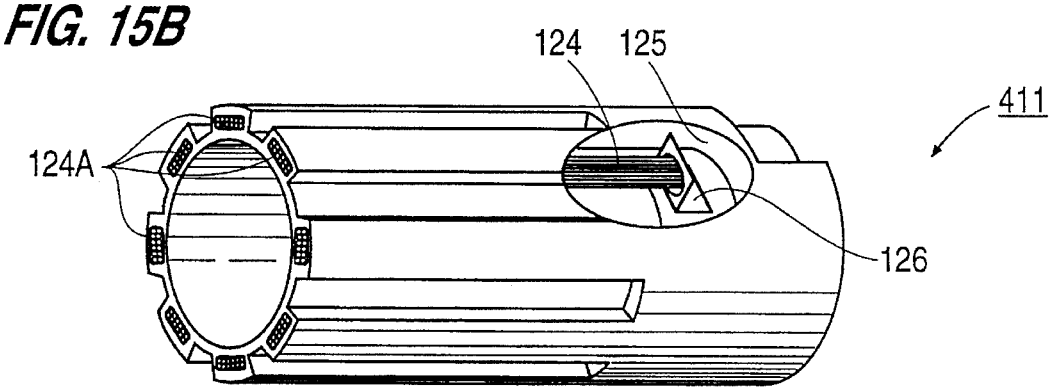
FIG. 15B shows a tool cover for the air tool of FIG. 15A with the tool cover partially cutaway.

As shown in FIG. 15B, protective tool body guard or "boot" 411 made of shock resistant material, such as flexible vinyl, is used to protect the tool housing (made of, for example, cast aluminum) from abrasion and to provide a better grip on the tool. In addition, the protective boot 411 may incorporate optical fibers 124 which are encapsulated within the opaque plastic medium 125 during the formation process of the boot 411. The converging ends of the fiber optic filaments 124 may be optocoupled to 45 degree glass mirrors 126 which are also encapsulated (except for the inward side). When the tool 410 is inserted into the boot 411 and the "window" 123 aligns with the inward side of the mirror 126, then light from the high intensity source 420 is concentrated at the ends of the fiber optic elements 124. The opposite ends 124A of the optical fibers, where the light emerges, are arranged in an encircling array about the working end of the tool so that light is transmitted to the work surface.

Figure 15C:
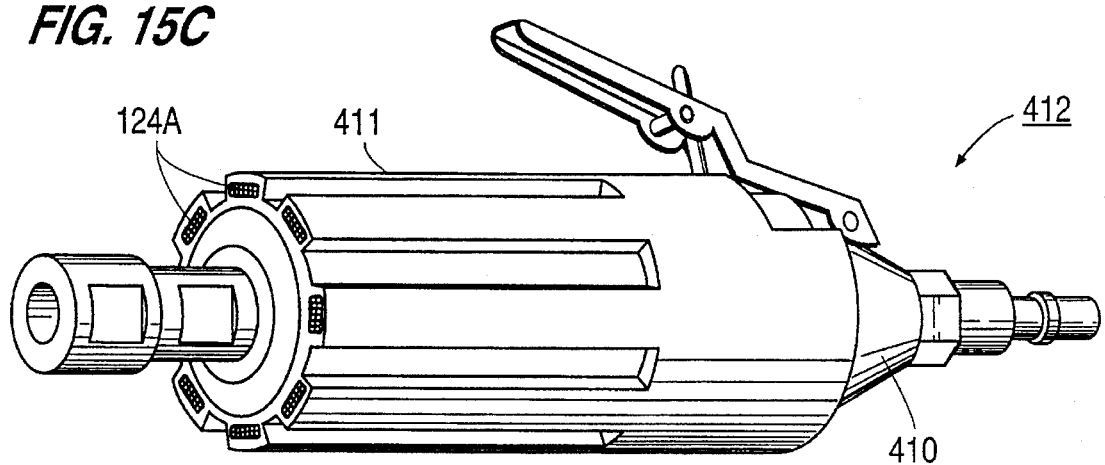
FIG. 15C shows the tool cover of FIG. 15B mounted on the tool of FIG. 15A.

Designated as 412 in FIG. 15C is a tool 410 incorporating a generator luminaire 58A (FIG. 15A) as it would appear with the fiber optic boot 411 covering the tool 410.

Figure 16:
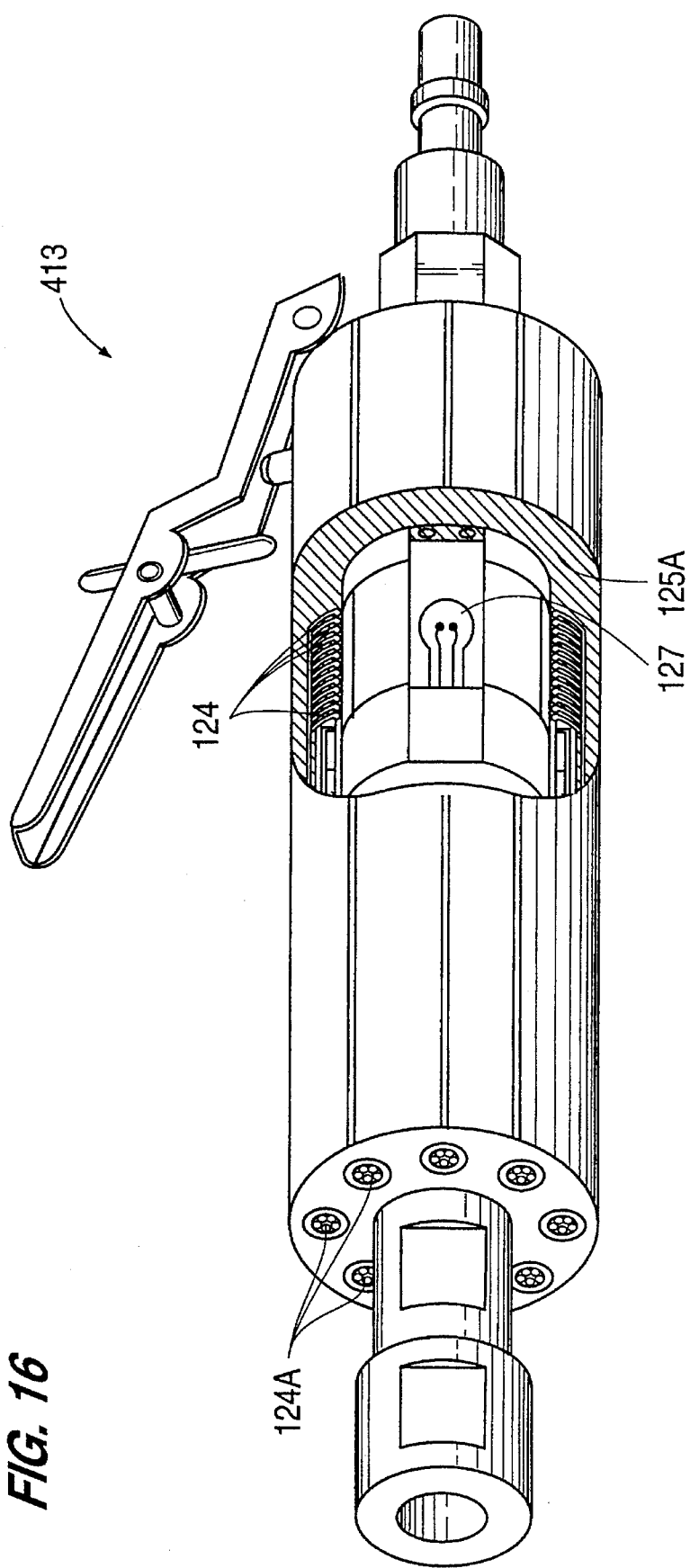
FIG. 16 shows another embodiment of an air tool having a stator similar to that of FIG. 14B.

FIG. 16 shows a tool 413 incorporating the above-described principles except that the optical fibers 124 are directly molded into a hard plastic tool housing or body 125A during the injection molding process, rather than being incorporated into a separate boot. FIG. 16 also shows a metal halide arc tube light source 127 (no filament) with the optical fiber ends 124 bending directly toward the source (having no mirrors) and with opposite ends 124A emerging as a "light ring" at the working end of the tool.

Figure 17:
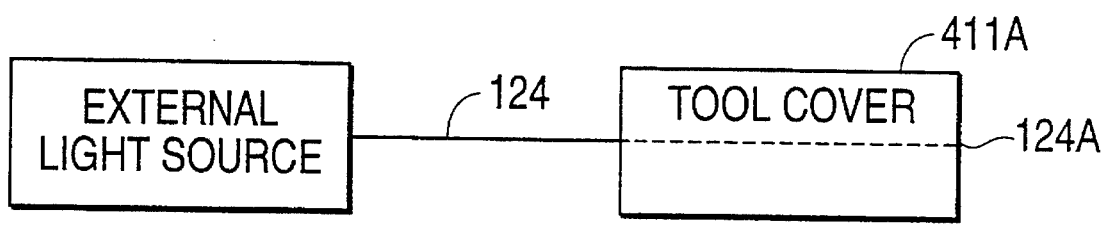
FIG. 17 schematically shows an optical fiber light ring arrangement.
Figure 18:
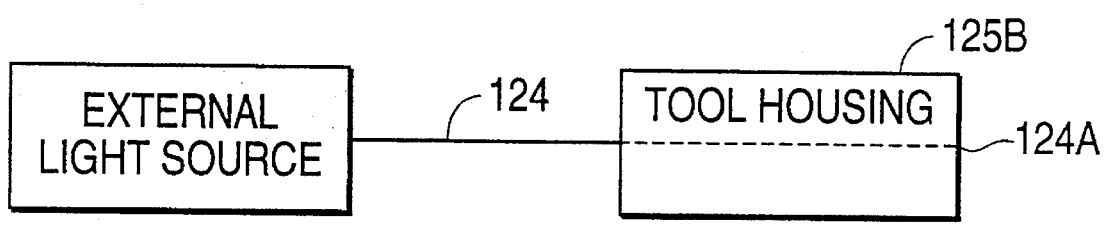
FIG. 18 schematically shows another optical fiber light ring arrangement.

Also contemplated within the present invention is the use of a lamp or a light source that is external to the tool housing, in combination with optical fibers and the tool cover or boot 411 of FIG. 15B or the tool housing or body 125A of FIG. 16. FIG. 17 schematically shows an external lamp connected by optical fibers 124 to a tool covering or boot 411A. The boot 411A is similar to the boot 411 except that the optical fibers exit the boot 411A and are connected to the external lamp. The ends 124A of the optical fibers 124 form a light ring similar to that in FIG. 15B. FIG. 18 schematically shows an external lamp arrangement similar to FIG. 17 except that the optical fibers 124 are connected to a tool housing 125B. The tool housing 125B is similar to the tool housing 125A shown in FIG. 16 except that the optical fibers 124 exit the tool housing 125B and are connected to an external light source. The ends of the optical fibers 124A form a circular light ring similar to that shown in FIG. 16. In FIGS. 17 and 18, the optical fibers 124 that connect the external light source to the tool cover 411A or tool housing 125B may be encased in an air hose used to supply compressed air to the air tool or may be in a separate optical fiber carrier.

While the present invention has been disclosed with reference to certain described embodiments, numerous changes, alterations and modifications to the described embodiments are possible without departing from the spirit and scope of the invention, as defined in the appended claims and equivalents thereof.

What is claimed is:

1. An air tool having a working end and comprising:
   A. a tool housing;
   B. a compressed air inlet; and
   C. an integrated air motor and electrical generator, for powering the tool and positioned within the housing and including:
      1. a shaft mounted on a bearing, for rotation within the housing;
      2. a rotor body having a circumferential surface and two axial ends, said rotor body being attached to the shaft;
      3. a plurality of vanes connected to the rotor body;
      4. a plurality of magnetic elements disposed within one of the two axial ends of the rotor body in a pole-side arrangement; and
      5. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air.

2. The air tool of claim 1, wherein the stator includes a plurality of poles and a plurality of coils mounted on respective poles wherein the poles are positioned equidistant from each other, a number of the poles is the same as a number of the magnetic elements and the poles are mounted in facing relationship to the magnetic elements so that axes of the poles are collinear with axes of respective magnetic elements.

3. The air tool of claim 1, wherein the bearing on which the shaft is mounted is positioned on a side of the rotor body adjacent the working end of the tool and the shaft does not extend beyond the opposite side of the rotor body.

4. The air tool of claim 1, wherein the rotor body is made of a nonmagnetic material.

5. The air tool of claim 4, wherein the material is stainless steel.

6. The air tool of claim 4, wherein the material is one of carbon fiber reinforced thermoplastic and glass fiber reinforced thermoplastic.

7. The air tool of claim 1, wherein the magnetic elements are made of a compound that includes neodymium, iron and boron.

8. The air tool of claim 3, further comprising a second bearing on which the shaft is mounted wherein the second bearing is positioned on the side of the rotor body adjacent the working end of the tool.

9. The air tool of claim 1, further comprising a second bearing on which the shaft is supported wherein the second bearing is disposed inside the stator.

10. The air tool of claim 2, wherein the poles are made of a magnetic material capable of conducting magnetic flux direction change frequencies of at least 1000 hertz.

11. The air tool of claim 10, wherein the magnetic material is one of a material comprising 49.4 percent cobalt, 1.94 percent vanadium, with the balance iron, and Alloy 4750.

12. The air tool of claim 2, wherein the coils include coil forms having inside wall thicknesses of about 0.010 inches.

13. The air tool of claim 2, wherein the stator includes a stator housing and thermal conductive potting material and wherein the poles and coils are potted in the thermal conductive potting material and enclosed by the stator housing.

14. The air tool of claim 13, wherein the stator housing is made of one of nonmagnetic metal, plastic and a ceramic material.

15. The air tool of claim 13, wherein the stator housing includes an air inlet channel formed on an exterior surface thereof.

16. The air tool of claim 1, wherein the stator includes a stator housing and further comprising a rotor collar disposed on the shaft on a side of the rotor body adjacent the working end of the tool, for maintaining a desired gap between the side of the rotor body opposite the working end of the tool and the stator housing.

17. The air tool of claim 16, wherein the desired gap is about 0.007 inches and a thickness of the stator housing opposite the magnetic elements is about 0.010 to 0.035 inches.

18. The air tool of claim 1, further comprising a battery and a battery charging circuit connected to the stator.

19. An air tool having a working end and comprising:
   A. a tool housing;
   B. a compressed air inlet;
   C. an integrated air motor and electrical generator, for powering the tool and positioned within the housing and including:
      1. a shaft mounted on a bearing, for rotation within the housing;
      2. a rotor body having a circumferential surface and two axial ends, the rotor body being attached to the shaft;
      3. a plurality of vanes connected to the rotor body;
      4. a plurality of magnetic elements disposed within one of the two axial ends of the rotor body;
      5. an air cylinder made of a nonmagnetic material and surrounding the plurality of vanes; and
      6. a stator positioned within the housing axially aligned with the rotor body, wherein the stator interacts with the magnetic elements to generate electricity when the rotor body is rotated by the compressed air;
   D. a battery charging circuit and a battery connected to the stator; and
   E. an indicating circuit connected to the battery charging circuit for indicating a battery charge condition, a battery discharge condition, and a low lubrication condition.

20. The air tool of claim 19, wherein the indicating circuit includes a resistance temperature detector bridge comprising a thermistor disposed in the vicinity of the air cylinder and responsive to a temperature of a cylinder wall and a thermistor responsive to a temperature of the compressed air.

21. The air tool of claim 20, wherein the indicating circuit includes a light emitting diode that emits a first color when the integrated air motor and electrical generator is producing electricity and the temperature of the cylinder wall is within a normal range, a second color when the temperature of the cylinder wall exceeds a normal range, and a third color when an electrical load is being drawn from the battery and the integrated air motor and electrical generator is not producing electricity.

22. An air tool having a working end and comprising:
   A. a tool housing;
   B. a compressed air inlet;
   C. an integrated air motor and electrical generator, for powering the tool and positioned within the housing and including:
      1. a shaft mounted on a bearing, for rotation within the housing;
      2. a rotor body having a circumferential surface and two axial ends, the rotor body being attached to the shaft;
      3. a plurality of vanes connected to the rotor body;
      4. a plurality of magnetic elements disposed within one of said two axial ends of the rotor body;
      5. an air cylinder made of a nonmagnetic material and surrounding the plurality of vanes; and
      6. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air;
   D. a battery charging circuit and a battery connected to the stator; and
   E. an indicating circuit connected to the battery charging circuit for indicating a battery charge condition, a battery discharge condition, and a low lubrication condition.

23. The air tool of claim 1, further comprising a light ring assembly attached to the tool housing to provide light at the working end of the tool.

24. An air tool, having a working end and comprising:
   A. a tool housing;
   B. a compressed air inlet;
   C. an integrated air motor and electrical generator, for powering the tool and positioned within the housing and including:
      1. a shaft mounted on a bearing, for rotation within the housing;
      2. a rotor body attached to the shaft;
      3. a plurality of vanes connected to the rotor body;
      4. a plurality of magnetic elements disposed in the rotor body; and
      5. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air; and
   D. a light ring assembly attached to the tool housing to provide light at the working end of the tool;
   wherein the light ring assembly includes:
   a generally cylindrical retainer ring having open ends and connected to the tool housing;
   an annular lens disposed in the retainer ring at an end furthest from the tool housing;
   an annular reflector having a plurality of openings formed therein and disposed adjacent the lens; and
   an annular ring having a plurality of lamps that are inserted in the openings of the annular reflector wherein the lamps are electrically connected to the stator.

25. The air tool of claim 24, wherein portions of the openings of the annular reflector are paraboloids.

26. An air tool having a working end and comprising:
   A. a tool housing;
   B. a compressed air inlet;
   C. an integrated air motor and electrical generator, for powering the tool and positioned within the housing and including:
      1. a shaft mounted on a bearing, for rotation within the housing;
      2. a rotor body attached to the shaft;
      3. a plurality of vanes connected to the rotor body;
      4. a plurality of magnetic elements disposed in the rotor body; and
      5. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air; and D. a light ring assembly attached to the tool housing to provide light at the working end of the tool;

wherein the light ring assembly includes:

a lamp electrically connected to the stator; and a plurality of optical fibers having first ends optically coupled to the lamp and second ends that terminate in a circular array at the working end of the tool.

27. The air tool of claim 26, wherein the tool housing includes at least one opening adjacent the lamp.

28. An air tool having a working end and comprising:
A. a tool housing;
B. a compressed air inlet;
C. an integrated air motor and electrical generator, for powering the tool and positioned within the housing and including:
  1. a shaft mounted on a bearing, for rotation within the housing;
  2. a rotor body attached to the shaft;
  3. a plurality of vanes connected to the rotor body;
  4. a plurality of magnetic elements disposed in the rotor body; and
  5. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air; and
D. a light ring assembly attached to the tool housing to provide light at the working end of the tool;

wherein the light ring assembly includes:

a generally cylindrical retainer ring having open ends and connected to the tool housing;

a drill chuck having a transparent cover and connected to the shaft at the working end of the tool;

an annular reflector having a plurality of openings formed therein and disposed adjacent the drill chuck; and an annular ring having a plurality of lamps that are inserted in the openings of the annular reflector wherein the lamps are electrically connected to the stator;

wherein the transparent cover of the drill chuck directs light from the lamps to a working surface.

29. An air tool having a working end and comprising:
A. a tool housing;
B. a compressed air inlet;
C. an integrated air motor and electrical generator, for powering the tool and positioned within the housing and including:
  1. a shaft mounted on a bearing, for rotation within the housing;
  2. a rotor body having a circumferential surface and two axial ends, the rotor body being attached to the shaft;
  3. a plurality of vanes connected to the rotor body;
  4. a plurality of magnetic elements disposed within one of the two axial ends of the rotor body;
  5. an air cylinder made of a nonmagnetic material and surrounding the plurality of vanes; and
  6. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air;
D. a battery charging circuit and a battery connected to the stator;
E. an indicating circuit connected to the battery charging circuit for indicating a battery charge condition, a battery discharge condition, and a low lubrication condition; and
F. a light ring assembly attached to the tool housing to provide light at the working end of the tool.

30. An air tool having a working end and comprising:
A. a tool housing;
B. a compressed air inlet;
C. an integrated air motor and electrical generator, for powering the tool and positioned within the housing and including:
  1. a shaft mounted on a bearing, for rotation within the housing;
  2. a rotor body having a circumferential surface and two axial ends, the rotor being attached to the shaft;
  3. a plurality of vanes connected to the rotor body;
  4. a plurality of magnetic elements disposed within one of the two axial ends of the rotor body wherein the magnetic elements are made of a compound that includes neodymium, iron and boron;
  5. an air cylinder made of nonmagnetic material and surrounding the plurality of vanes; and
  6. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air;
D. a battery charging circuit and a battery connected to the stator;
E. an indicating circuit connected to the battery charging circuit for indicating a battery charge condition, a battery discharge condition, and a low lubrication condition; and
F. a light ring assembly attached to the tool housing to provide light at the working end of the tool;
G. wherein the stator includes a plurality of poles and a plurality of coils mounted on respective poles wherein the poles are positioned equidistant from each other, a number of the is the same as a number of the magnetic elements and the poles are mounted in facing relationship to the magnetic elements so that axes of the poles are collinear with axes of respective magnetic elements; and
H. wherein the poles are made of one of a material comprising 49.4 percent cobalt, 1.94 percent vanadium, with the balance iron, and Alloy 4750.

31. An illuminating apparatus for a power tool having a spindle and a tool housing, comprising:

a housing having first and second ends;

a lens disposed at the first end of the housing;

a lamp disposed behind the lens;

a reflector surrounding the lamp and including a coil connected to the lamp; and a rotor including a magnetic element wherein the rotor is attachable to the spindle and is disposed adjacent the coil whereby rotation of the rotor induces electromotive force in the coil;

wherein the second end of the housing includes a retaining ring for attachment to the tool housing.

32. The apparatus of claim 31, further comprising a plurality of lamps disposed behind the lens wherein the reflector includes a plurality of coils connected to the lamps and the rotor includes a plurality of magnetic elements.

33. The apparatus of claim 32, wherein the rotor includes air moving fan blades and the housing includes at least one cooling port.

34. The apparatus of claim 32, wherein the rotor is attachable to the spindle by one of a set screw and a keyway.

35. The apparatus of claim 32, wherein the reflector is made of a magnetic material capable of conducting magnetic flux direction change frequencies of at least 1000 hertz.

36. The apparatus of claim 35, wherein the magnetic material is one of a material comprising 49.4 percent cobalt, 1.94 percent vanadium, with the balance iron, and Alloy 4750.

37. The apparatus of claim 35, wherein the coils include coil formers having inside wall thicknesses of about 0.010 inches.

38. The air tool of claim 27, further comprising an elastomeric, opaque tool cover that covers at least a part of the tool housing wherein a portion of each optical fiber is encapsulated in the tool cover.

39. The air tool of claim 27, further comprising at least one mirror for optically coupling an optical fiber to the lamp.

40. The air tool of claim 26, wherein the plurality of optical fibers are encapsulated in the tool housing.

41. The air tool of claim 1, further comprising a plurality of damping sleeves disposed between the rotor body and the plurality of magnetic elements.

42. A air tool having a working end and comprising:

A. a tool housing;

B. a compressed air inlet; and

C. an integrated air motor and electrical generator, for powering the tool and positioned within the housing and including:
  1. a shaft mounted on a bearing, for rotation within the housing;
  2. a rotor body attached to the shaft;
  3. a plurality of vanes connected to the rotor body;
  4. a plurality of magnetic elements disposed in the rotor body; and
  5. a stator positioned within the housing axially aligned with the rotor body, on a side of the rotor body opposite the working end of the air tool and between the compressed air inlet and the rotor body such that compressed air flows across the stator, wherein the stator interacts with the magnetic elements to generate electricity when the rotor body is rotated by the compressed air; and D. a light ring assembly attached to the tool housing to provide light at the working end of the tool;

wherein the light ring assembly includes:

a lamp located external to the tool housing; and a plurality of optical fibers having first ends optically coupled to the lamp and second ends that terminate in a circular array at the working end of the tool.

43. The air tool of claim 42, further comprising an elastomeric, opaque tool cover that covers at least a part of the tool housing wherein a portion of each optical fiber is encapsulated in the tool cover.

44. The air tool of claim 42, wherein a portion of each of the plurality of optical fibers is encapsulated in the tool housing.

* * * * *